United States Patent
Patterson et al.

(10) Patent No.: US 6,802,394 B2
(45) Date of Patent: Oct. 12, 2004

(54) LUBRICATING DEVICE

(75) Inventors: Denis Arthur John Patterson, Worcester (GB); Simon Stone, Tewkesbury (GB)

(73) Assignee: Wymark Limited, Cheltenham (GB)

( * ) Notice: Subject to any disclaimer, the term of this patent is extended or adjusted under 35 U.S.C. 154(b) by 111 days.

(21) Appl. No.: 10/239,352

(22) PCT Filed: Mar. 14, 2001

(86) PCT No.: PCT/GB01/01114

§ 371 (c)(1), (2), (4) Date: Sep. 18, 2002

(87) PCT Pub. No.: WO01/71240

PCT Pub. Date: Sep. 27, 2001

(65) Prior Publication Data

US 2003/0037995 A1 Feb. 27, 2003

(30) Foreign Application Priority Data

Mar. 21, 2000 (GB) ............................................. 0006871

(51) Int. Cl.$^7$ ................................................ F16N 11/04
(52) U.S. Cl. ..................... 184/45.1; 184/37; 184/105.1; 74/1.5
(58) Field of Search ........................... 74/1.5, 422, 575; 184/7.4, 27.1, 37, 45.1, 45.2, 105.1

(56) References Cited

U.S. PATENT DOCUMENTS

| | | | | |
|---|---|---|---|---|
| 346,981 A | * | 8/1886 | Bingham | .................... 184/45.1 |
| 595,826 A | * | 12/1897 | Walch | ......................... 184/37 |
| 774,960 A | * | 11/1904 | Walch | ......................... 184/45.2 |
| 984,481 A | * | 2/1911 | Hickish | ...................... 184/45.1 |
| 1,399,522 A | * | 12/1921 | August | ...................... 184/45.2 |
| 1,640,407 A | * | 8/1927 | Herbert | ..................... 184/45.2 |
| 1,929,774 A | | 10/1933 | Davis | |
| 4,668,220 A | | 5/1987 | Hawrylenko | |
| 4,799,574 A | * | 1/1989 | Bras | ........................... 184/27.1 |
| 4,941,550 A | | 7/1990 | Blake | |
| 5,271,528 A | * | 12/1993 | Chien | ........................... 222/63 |

FOREIGN PATENT DOCUMENTS

| | | |
|---|---|---|
| EP | 0 598 678 | 5/1994 |
| EP | 0 603 141 | 6/1994 |
| EP | 0 704 654 | 9/1994 |

* cited by examiner

Primary Examiner—David A. Bucci
Assistant Examiner—Timothy McAnulty
(74) Attorney, Agent, or Firm—Stephen H. Eland; Dann, Dorfman, Herrell and Skillman

(57) ABSTRACT

A self-contained automatic lubricator for automatically dispensing fluent lubricant over a period of time is provided. The lubricator comprises a cylinder having a front wall with a discharge outlet, a rear wall and cylindrical side walls. A piston is movable within the cylinder from a rear position to a forward position. The piston and the side and front walls of the cylinder define a variable volume chamber for containing the lubricant to be dispensed, and a spring for moving the piston from its rear position towards it front position to reduce the volume of the variable volume chamber over a period of time for expelling lubricant through the discharge outlet. The lubricator further comprises a controller including gearing and an escapement mechanism, for controlling the transfer of energy from the spring to the piston and an electrical element controlling operation of the escapement mechanism (12).

28 Claims, 8 Drawing Sheets

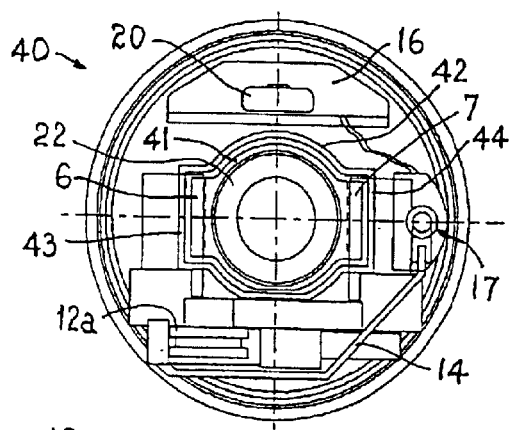
FIG. 15
FIG. 13
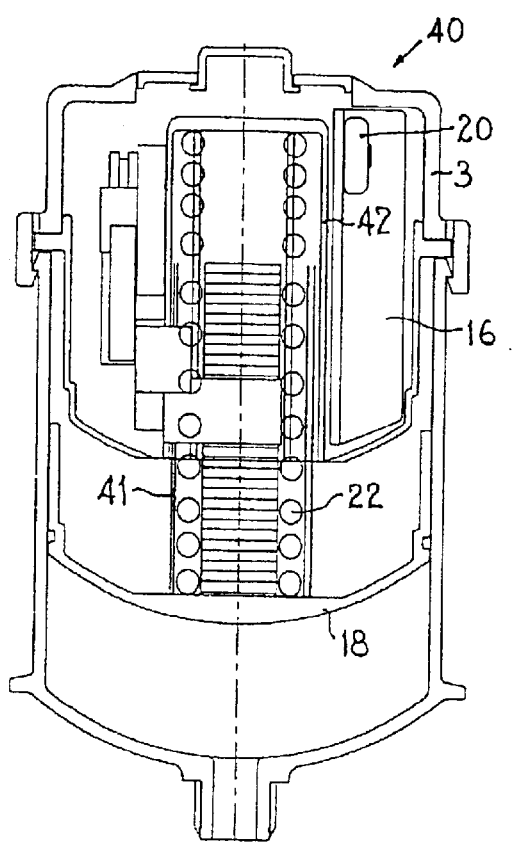
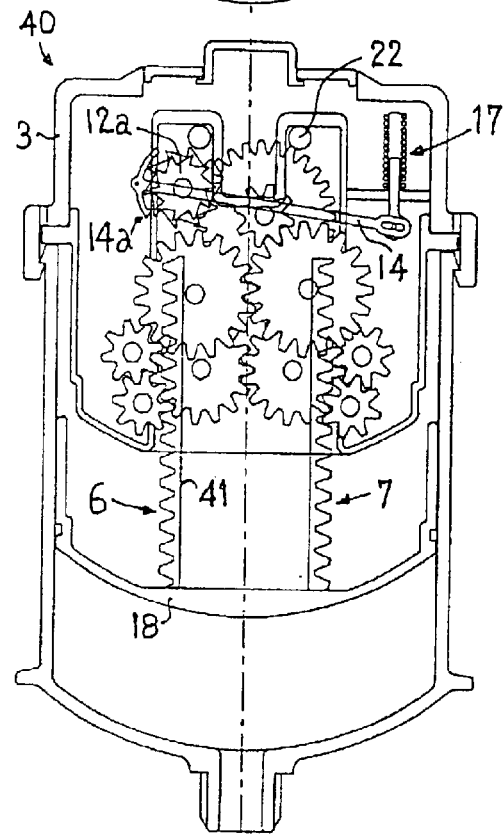
FIG. 14

LUBRICATING DEVICE

TECHNICAL FIELD

This invention relates to a lubricating device for automatically delivering lubricant, such as grease or oil, over an extended period of time, the lubricating device being of the kind comprising cylinder means having front wall means with a discharge outlet, rear wall means and cylindrical side walls, piston means movable within the cylinder means from a rear position to a forward position, the piston means and the side and front wall means of the cylinder means defining a variable volume chamber for containing the lubricant to be dispensed, helical spring means movable from a compressed condition to an expanded condition to release spring force for moving the piston means from its rear position towards its front position to reduce the volume of the said variable volume chamber over a period of time for expelling lubricant through the discharge outlet, and control means for controlling the movement of said spring means from its compressed condition to its expanded position and comprising an escapement mechanism, electrical means controlling the operation of the escapement mechanism and gearing connected between said escapement mechanism and said piston means

BACKGROUND OF THE INVENTION

Dispensing devices for lubricants of the kind generally known as self-contained automatic lubricators were introduced almost 40 years ago and have now become widely used for dispensing lubricants into lubricant channels of machine bearings over prolonged periods of time, for example from between 1 and 12 month. Such self-contained devices are supplied to users ready-filled with lubricant for fitting temporarily to the bearings they are intended to lubricate. They are designed to lubricate for a predetermined period without further attention on the part of the user. Once that period is over and the lubricant contents have been spent, the entire lubricator is removed and replaced with another. Self-contained automatic lubricators are particularly advantageous for the lubrication of scattered and isolated bearings, such as exist, for example, in water treatment works, dockyards, traffic barriers and countless other applications. Millions of self-contained automatic lubricators are now used annually world-wide and they are steadily replacing older methods of lubricating bearings involving labour intensive replenishment of lubricant by the frequent application of hand-operated grease guns. As self-contained automatic lubricators are normally screwed directly into grease nipple sockets and are frequently required to be fitted in confined spaces, they are designed to be very compact and as light in weight as possible. The great majority of such lubricators are designed to dispense between 100 ml and 120 ml of lubricant. They typically exert pressures of about 0.5 bar or more when injecting lubricant into bearings offering no resistance to flow but are capable of exerting pressures up to 5 bar when necessary to overcome resistance to flow in the bearing. Typically, this requires the lubricators to apply forces varying from 100 N up to 1000 N in order to move pistons in lubricant chambers of from 50 to 60 mm in diameter.

Self-contained automatic lubricators of this type are relatively inexpensive and are quite different from more complicated centralised lubrication systems such as are designed for lubricating all the bearings of, for example, a single large machine inside a factory building, which are designed to be permanent fixtures, which require high operating pressures and which are bulky, heavy and expensive.

Self-contained automatic lubricators are not to be confused with some earlier types of single-point lubricator that were designed to be fixed permanently to a single bearing for refilling in-situ and which were much heavier, bulkier and more expensive. A known lubricating device of the kind referred to is described in U.S. Pat. No. 1,929,774. This device is an early type of "permanent" lubricator designed to be repeatedly filled in situ—i.e. it is not a so-called self-contained automatic lubricator of the type described above. It is supplied with electricity from an external supply and, consequently, is not self-contained. It is also relatively bulky and heavy with the escapement mechanism and associated gearing being positioned axially behind the helical spring means resulting in the lubricating device being relatively long in the axial direction.

Other known single-point lubricators that antedate self-contained automatic lubricators as described hereinbefore have spring means consisting of helical compression springs but are designed to be permanent fixtures and, unlike self-contained automatic lubricators, require frequent replenishment by means of hand-operated grease guns. On actuation of the lubricator, the energy from the spring is released to urge the piston device to move towards its forward position thereby expelling the lubricant. The helical compression spring is thus the only force generating means acting on the piston to expel the lubricant. Although the rate at which the lubricant is discharged can be influenced by substituting springs with different characteristics, by valving or by varying the discharge orifice, the actual rate of discharge of such a device on a particular bearing is governed primarily by the resistance in the bearing channels, the fluidity of the lubricant, and the ambient temperature (which affects the fluidity of the lubricant). Although such a known lubricator can be made relatively inexpensively, it does not have the facility to preset or predetermine a rate of lubricant discharge that is independent of the variable factors mentioned above. Furthermore for certain applications and operating conditions the lubricator will dispense all its lubricant within a few weeks of initiating the lubricant dispensing process.

In order to overcome the disadvantages of the known single-point lubricators, self-contained automatic lubricators have been designed in which the spring means have been replaced by actuating means which can be controlled to vary the rate of lubricant discharge in a controlled manner. In such self-contained automatic lubricators, the piston device separates the cylinder into a variable volume first chamber containing the lubricant to be dispensed and a second chamber. The second chamber contains an electrolyte into which a galvanic element comprising different metallic materials that are connected together electrically to form electrodes can be introduced from a third chamber. The resultant electro-chemical reaction gradually generates gas which moves the piston device to discharge the lubricant content. Lubricators of this type can be set to discharge over periods as long as 12 months at rates that can be predicted with limited accuracy. They have the disadvantage that the electrochemical reaction is very sensitive to changes in ambient temperature and it is necessary for users to consult tables to determine the approximate discharge rate and operating duration at specific ambient temperatures (which in working conditions can vary from as low as −20° C. to as high as +55° C.). Examples of such lubricators are described in GB-A-1,401,535 and U.S. Pat. No. 3,430,731.

Another known self-contained automatic lubricator is described in EP-A-0278138 and has a chamber containing an electrolyte together with electric batteries which enable an electric current to be passed through the electrolyte to generate gas, together with electric or electronic control means for switching on or off and/or varying the current flow and hence the rate of gas generation and the rate of discharge of lubricant. The discharge rates of such lubricators can be predicted with limited accuracy and they can operate for long durations, but they have the disadvantages that they require a relatively large battery pack to maintain the electrochemical reaction over long periods, the electrochemical reactions are temperature sensitive and the lubricators are relatively expensive.

It is also known from German G9214096.3 for a self-contained automatic lubricator to be provided with batteries and a geared down motor for driving a screw which moves the piston device to discharge the lubricant. Electric or electronic controls are provided for switching on or off and/or varying the current flow to vary the rate of discharge of the lubricant. Such known lubricators enable accurate discharge rates to be set, the rates are relatively independent of ambient temperature variations, and they can operate for long periods. However they have the disadvantages that the powerful electric motor and gearing make the lubricators heavy and bulky, they need a large battery pack to provide adequate power to operate the motor and gearing, and they are relatively expensive.

In EP-A-0598678 there is described a self-contained automatic lubricator equipped with a piston, a rotatable threaded rod, an escapement comprising a toothed wheel connected to the threaded rod and a rocker arm for regulating the turning of the threaded rod, an electromagnet and a timer all powered by a battery. The specification states that rocker arm rotates the threaded rod and that the spring assists the movement of the piston. This implies that the threaded rod is provided with a conventional screw thread requiring an extremely powerful drive for the toothed wheel. Such a device is not particularly practical requiring a substantial force to rotate the threaded shaft and move the piston. Since a substantial force is required to move the piston to expel the lubricant, an escapement rocker and electromagnet operating in the manner shown would need to be extremely strong and would require very large batteries to power them. The cap or chamber containing the control mechanism and batteries is positioned axially behind a helical spring and would need to be many times larger than illustrated in the drawings.

It is also known to provide devices for automatically dispensing medicaments into patients as disclosed, for example, in U.S. Pat. Nos. 4,313,439, 4,300,554, 4,059,110, 4,921,487, WO-A-82/00589 and GB-A-2,166,497. At least some of these medicament dispensing devices use a combination of spring means with electrically controlled escapement means for regulating the dispensing rate of the medicament into patients. All these known medicament dispensing devices are designed to hold and actuate conventional medical syringes by temporarily incorporating them into large housings fitted with powerful geared motors and actuating systems which require large electric batteries to operate them. They are consequently relatively bulky and the ratio of the overall volume of the complete dispensing devices to the volume of medicament the devices are to dispense is typically between 20:1 and 60:1. This relative bulkiness is of no disadvantage in the case of a medicament dispenser because the amount of medicament required to be dispensed is relatively small and the complete device can be suspended on a patients belt or on a hospital bed rail and the medicament can be fed to the patient's body via a tube fitted to a needle or catheter. These known medicament dispensing devices are typically intended to dispense medicaments over a short time span, e.g. several hours, and are not designed to dispense fluent material for longer periods of time, e.g. over several months.

SUMMARY OF THE INVENTION

One aim of the present invention is to provide an improved lubricating device in the form of a self-contained automatic lubricator. Another aim of the invention is to provide a lubricating device in which the dispensing of lubricant can be controlled and which overcomes the disadvantages of known self-contained automatic lubricators and other types of single-point lubricator.

Preferred additional aims are to provide a lubricating device which is self-contained, is of compact design, does not use large battery packs and/or motors for operation over an extended period of time and is spring-operated.

According to the present invention there is provided a lubricating device as claimed in the ensuing claim 1.

With a lubricating device according to the invention the source of power for moving the piston means is provided by the spring means. The electrical means can be operated at relatively low power since its main function is to power the control means for controlling the release of spring energy from the helical spring means as it moves from its compressed condition to its expanded position. Thus low power batteries housed within the lubricating device can be employed.

By arranging for the gearing to be positioned either inside, so as to be surrounded by, the helical spring means, or (radially) outside the helical spring means, the lubricating device can be made of a compact design compared with known designs in which the gearing is positioned axially in-line with spring means.

Preferably the escapement mechanism and/or the electrical means are/is either positioned with the gearing inside, so as to be surrounded by, the helical spring means, or, alternatively, are positioned with the gearing radially outside the centrally positioned helical spring means. In either case the lubricating device is of a compact, self-contained design. Preferably the lubricating device has a ratio of overall volume of the complete lubricating device to the volume of lubricant it is to dispense at no more than 5:1 and preferably no more than 2.5:1. Such a compact, self-contained automatic lubricator is of completely different design to known lubricators and other dispensers of fluent material.

The control means may further comprise a control device providing a mechanical connection between the gearing and the piston means. Suitably the control device is either positioned with the gearing inside, so as to be surrounded by, the helical spring means, or is positioned with the gearing radially outside the centrally positioned helical spring means. Preferably the control device comprises at least one rack member which is connected to the piston means and is in mechanical connection with at least one gear wheel of the gearing. In this case the or each rack member may have at least two sets of teeth in mechanical connection with at least two gear wheels of said gearing.

Alternatively, for example, the control device may comprise a rotatable screw-threaded member screw-threadedly engaged with screw means provided on the piston means and connected to said gearing, movement of the piston from its rear position to its forward position by the spring means causing the screw-threaded member to turn. The turning of the screw-threaded member by the spring force acting through the piston means is controlled by the escapement mechanism and the gearing to regulate the movement of the piston means.

Preferably the spring means comprises one or more helical compression springs which are relatively powerful and provide the motive force required to move the piston means. The compression spring or springs may be disposed slidingly adjacent to the side walls of the cylinder means to exert pressure directly on the piston means in order to expel the lubricant from the discharge outlet, or may be disposed slidingly within a centrally positioned tubular extension of the piston to similarly exert pressure directly on the piston. The compression spring(s) may be selected with characteristics that ensure that when the piston means is moved to the end of its stroke to fully discharge the lubricant, the or each spring utilises only part of its extending capacity so as to ensure that it continues to apply adequate force even at the end of the stroke of the piston means. Two or more compression springs may be provided arranged coaxially within each other. The spring force is transmitted from one end of a compression spring to the other end of a radially adjacent compression spring by means of a "floating" force transmission member arranged between the compression springs. The provision of two or more such helical compression springs combined with one or more such "floating" transmission members enables greater pressure to be exerted on the piston within a compact design. In general the provision of more than one helical spring is more suited to the arrangement in which the helical spring means surround the gearing. However it is also possible for the helical spring means to comprise more than one helical spring in the case where the gearing is positioned radially outside the spring means. Suitably Suitably the electrical means comprises an electric battery, actuation means, such as a servo or solenoid device, for operating the escapement mechanism, and settable timing means for controlling the frequency of operation of the actuation means for controlling the rate of discharge of the fluent lubricant from the variable volume chamber. The electrical means is intended to enable the operation of the escapement mechanism to be adjusted so that the rate of dispensing of lubricant can be preset and/or adjusted as required. The timing means can be connected to a dial in the outer casing of the lubricating device to enable a user to rotate the dial from an inactive or off position to any of a selection of settings to operate the control means to manipulate the escapement mechanism in appropriately timed pulses to discharge the lubricant at the rate selected by the user. Conveniently the timing means is settable for dispensing lubricant over a period of up to 36 months, typically from 1 to 24 months.

It is preferred for lightness and cost of manufacture for the gearing to comprise a plurality of meshing gear wheels made of plastics material.

The escapement mechanism may be similar to those used to control mechanical clockwork movements, e.g. it may comprise a pivoted arm with two hook shaped projections which alternatively engage and disengage with teeth of a toothed wheel of the gearing as the arm is moved from side to side. As one hook shaped projection disengages from one tooth and allows the toothed gear wheel to turn under pressure from the spring means, the other projection engages with another tooth and halts the movement until the escapement arm is moved again. Only light force is required to move or operate such an escapement mechanism and yet the powerful spring force of the spring means can be released in increments. Alternative escapement mechanisms, e.g. an electro magnetically operated braking device, may be provided instead of a conventional mechanical escapement mechanism of the type used to control clockwork movements.

In the preferred design of lubricating device, the motive force for the lubricating device is provided by one or more powerful, yet preferably compact and inexpensive, helical springs and the transmission of the motive force is arranged by means of rack and pinion means combined with simple gearing and an escapement mechanism. The control of the escapement mechanism is effected by means of light duty electrical means powered by a small battery. The resultant lubricating device is a self-contained, automatic self-contained automatic lubricator which is compact, light in weight and inexpensive, and yet it is able to offer an accurate means of dispensing lubricants at precise selected rates irrespective of ambient temperature, the varying characteristic of the spring or springs, and the resistance of bearing lubricant channels.

BRIEF DESCRIPTION OF THE DRAWINGS

Embodiments of the invention will now be described, by way of example only, with particular reference to the accompanying drawing, in which:

FIGS. 13, 14 and 15 are a schematic sectional side view, a schematic sectional rear view and a schematic sectional top view, respectively, of a third embodiment of a lubricating device according to the invention in the form of a self-contained single-point automatic lubricator and with helical spring means in an intermediate position between compressed and expanded conditions.

DESCRIPTION OF THE PREFERRED EMBODIMENTS

Figure 1:
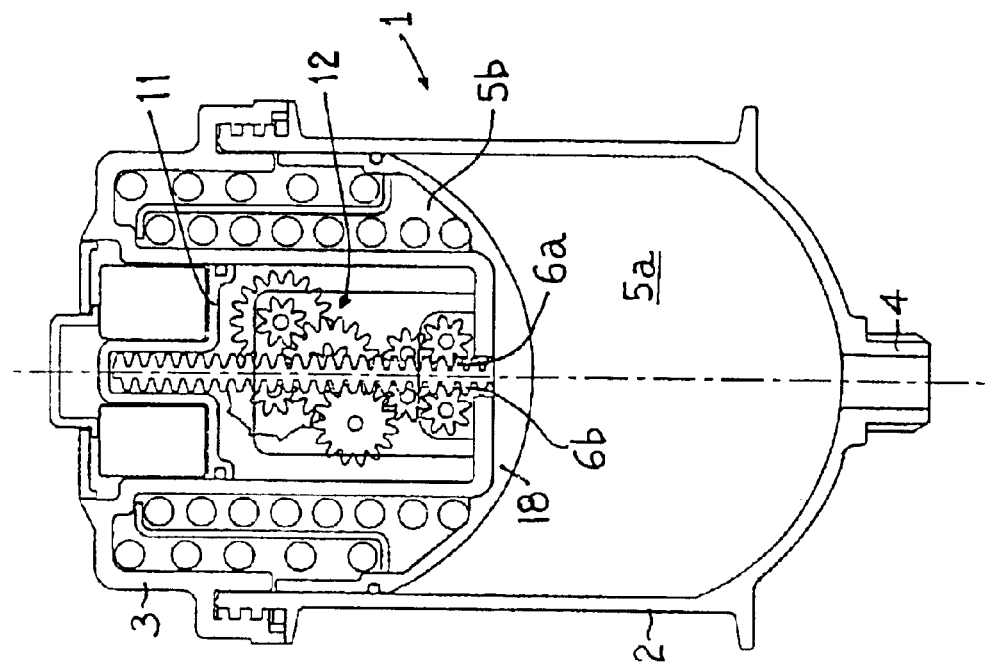
FIGS. 1 and 2 are schematic sectional side and rear views, respectively, of one embodiment of a lubricating device according to the invention in the form of a self-contained single-point automatic lubricator and with helical spring means in a compressed condition.
Figure 2:
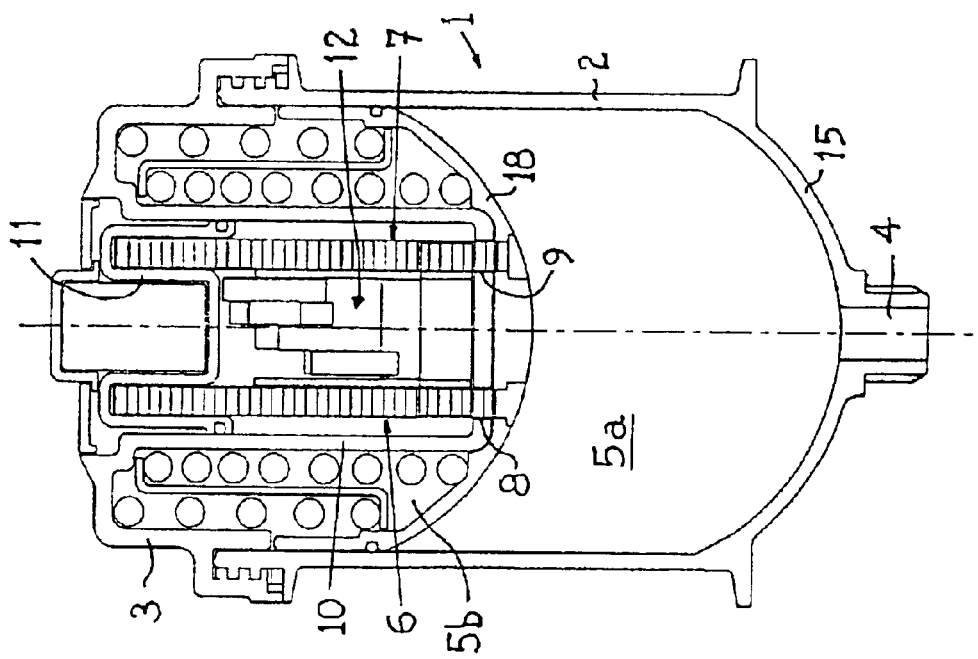
Figure 3:
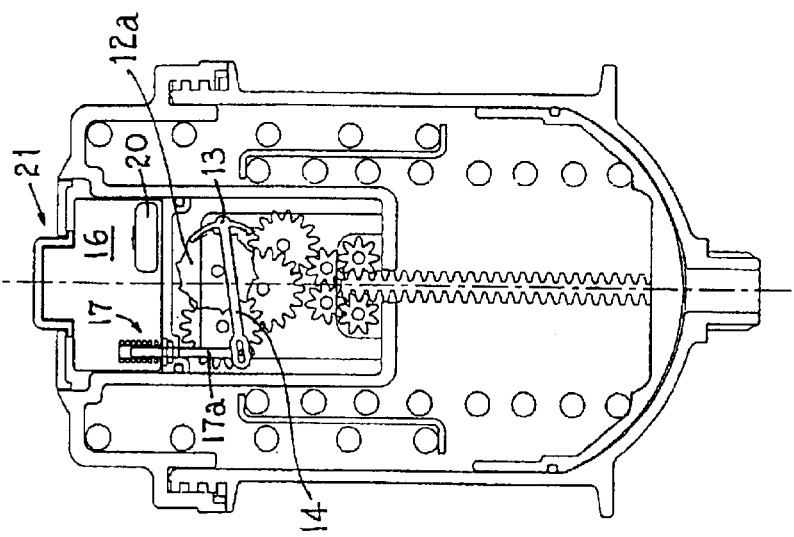
FIGS. 3 and 4 are schematic sectional front and rear views, respectively, of the lubricating device shown in FIGS. 1 and 2 with the helical spring means in an expanded condition.
Figure 8:
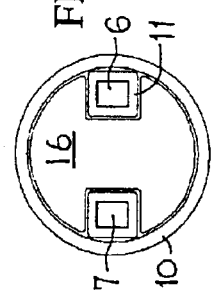
FIG. 8 is a schematic view taken on the line III—III of FIG. 6.
Figure 6:
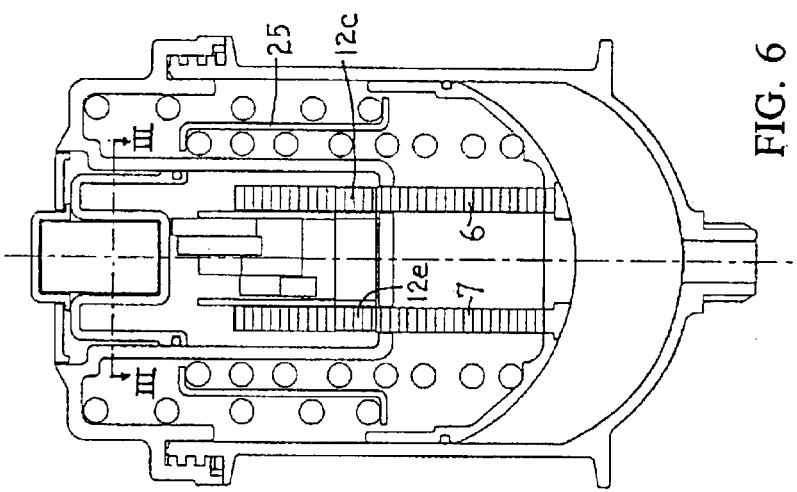
FIGS. 6 and 7 are schematic sectional side and rear views, respectively, of the lubricating device shown in FIGS. 1 and 2 with the helical spring means in an intermediate position between the compressed and expanded conditions.
Figure 5:
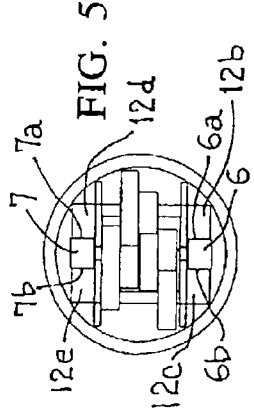
FIG. 5 is a schematic view taken on the line II—II of FIG. 4.
Figure 4:
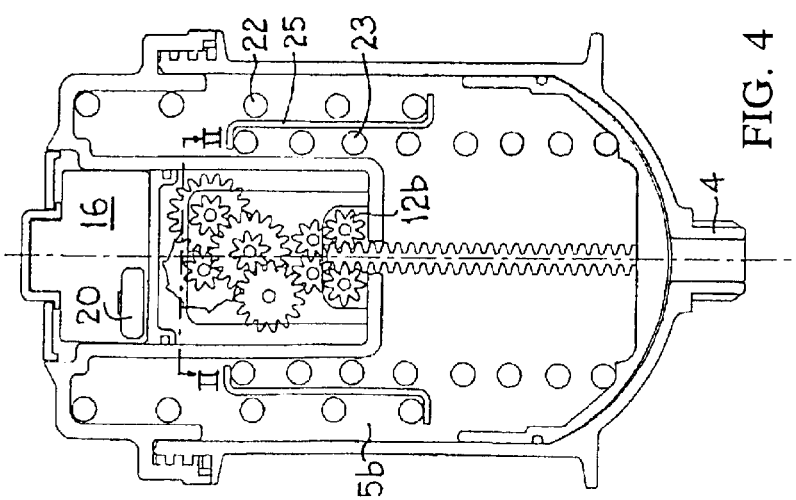
Figure 7:
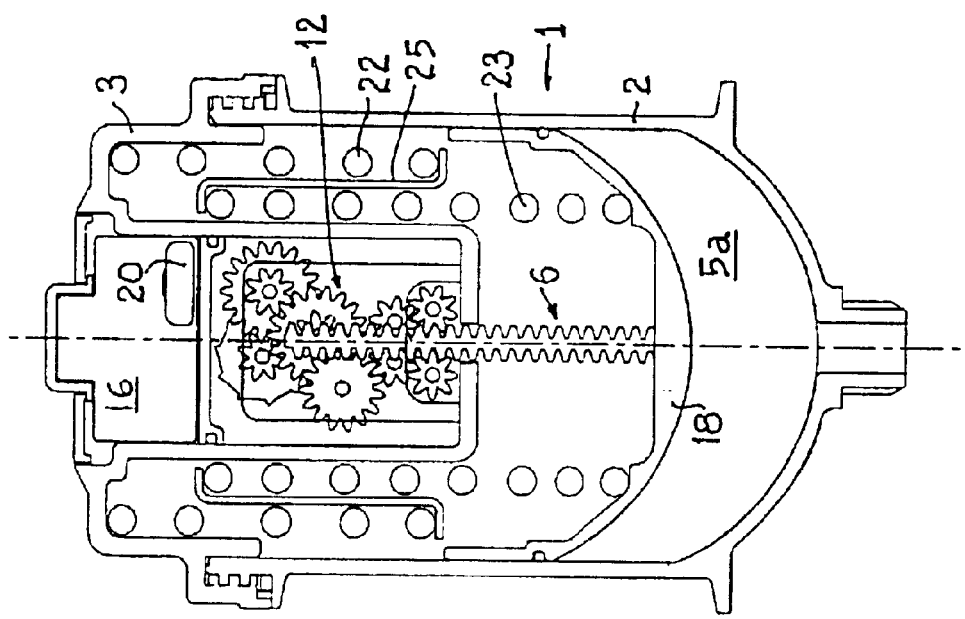

FIGS. 1 to 11 show one embodiment of a lubricating device according to the invention in the form of a self-contained automatic single-point lubricator 1 for dispensing lubricant such as grease or oil over an extended period of time. The lubricator 1 comprises a cylinder 2 closed at one end by a cap 3 and having a lubricant outlet 4 at its other end 15. A piston device 18 is slidably movable within the cylinder 2 between a rear position (shown in FIGS. 1 and 2) and a forward position (shown in FIGS. 3 and 4). The piston device separates the cylinder into a variable volume first chamber 5a containing lubricant to be dispensed through the outlet 4 and a second chamber 5b. The outlet 4 is provided with a removable screw-threaded cap (not shown) and the outlet is intended in use to be screwed into a lubricating point of a machine to enable the lubricant to be dispersed into a lubricant channel of a bearing of the machine over a period of time.

The piston device 18 has a pair of elongate toothed rack members 6 and 7 extending upwardly (as viewed in FIGS. 1 to 4) therefrom. Each toothed rack member 6, 7 has pairs of elongate racks 6a, 6b and 7a, 7b, the teeth of each rack projecting to opposite sides of the lubricator.

The rack members 6 and 7 project upwardly through a pair of openings 8 and 9 at the bottom of a cylindrical recess 10 formed in the end cap 3 and closed by a cover 11. Within the cylindrical recess 10 there is housed gearing, generally designated 12, and an escapement mechanism having an escapement rocker arm 14 (see FIGS. 3, 10 and 11) pivoted at 13. The escapement rocker arm 14 has a hook-shaped projection 14a and an end portion 14b engaging and disengaging with teeth of a gear wheel 12a of the gearing 12. The pivotal movement of the escapement rocker arm 14 is controlled by electrical means 16 housed in the upper part of the cylindrical recess 10 above the cover 11. The electrical means includes a battery 20, actuation means in the form of a small servo or solenoid device 17 having a control rod 17a connected to the escapement rocker arm 14, a timing device (not shown) forming part of electronic circuiting and switching means operated by a dial 21 (see FIG. 9) for turning the lubricator 1 on and off and for setting the timing device.

Compressed helical spring means provide the motive force for moving the piston device 18 towards its forward end. As shown, the spring means consists of two helical compression springs 22 and 23 arranged coaxially one within the other and a "floating" or sliding force transmitting member 25 positioned between the two springs 22 and 23 in order to enable the two springs to work in tandem and exert a combined axial spring force directly on the piston device 18. The two helical compression springs 22 and 23 are positioned in the cylinder 2 between the cap 3 and the piston device 18, with spring 22 acting directly on the cap 3 and with spring 23 acting directly on the piston device 18. As shown, the member 25 has a cylindrical intermediate portion, a lower radially outer annular projection against which the lower end of the outer spring 22 is seated and an upper radially inner annular projection against which the upper end of the inner spring 23 is seated.

By setting the dial 21, the lubricator 1 can be preset to dispense the lubricant over different periods of time—typically from 1 to 24 months. Thus if the lubricator is set to operate over a short period of time the escapement arm 14 is caused to pivot relatively quickly between its limit positions. As one projection 14a disengages from a tooth of the gear wheel 12a, the wheel 12a turns and frees the gearing 12. The meshing gear wheels of the gearing are allowed to turn with final gear wheels 12b, 12c and 12d, 12e meshing with the teeth of the racks 6a, 6b and 7a, 7b, respectively. Thus the rack members 6 and 7 move incrementally downwardly, under the force of the compressed springs, until the other projection 14a engages in another tooth of the gear wheel 12a. As the rack members 7 move downwardly, under control of the escapement mechanism, the piston device 18 moves in the cylinder 2 towards the forward end of the cylinder and dispenses lubricant through the outlet 4. The cover 11 is shaped to receive the upper ends of the rack members 6 and 7 when they are in their upper positions.

The purpose of the gearing up from the gear wheels 12b–e engaging the rack members 6 and 7 to the escapement mechanism is to reduce the force required to operate the escapement mechanism. This allows a small, low-powered battery to be used. By way of example, the rack members 6 and 7 typically have a stroke of about 45 mm and the gear wheels 12b–e turn about 2.5 complete turns during a full stroke.

As discussed above, in the particularly preferred embodiment of the invention shown in FIGS. 1 to 11, two helical compression springs 22 and 23 are positioned in the cylinder 2 between the cap 3 and piston device 18 and act directly on the piston device 18. These springs 22 and 23 provide the force to move the piston device 18 under the control of the escapement mechanism and associated electrical means. The rate of discharge of lubricant is fully controlled and is not dependent on ambient temperatures. Instead, the rate of lubricant discharge is controlled by the timing device of the electrical means regulating the escapement mechanism 12. In other embodiments of the invention (not shown), one, or more than two, helical springs may be provided. However, according to the design described, it will be appreciated that the helical springs surround the gearing 12, the escapement mechanism and the electrical means. By positioning the helical spring means to surround the gearing, escapement mechanism and electrical means in this way, instead of having these components positioned in a separate enclosure above the spring means, the axial length of the lubricator can be reduced.

By way of example only, the lubricator shown and described in FIGS. 1 to 11 may be designed so that the piston means 18 is moved from its upper position (FIGS. 1 and 2) to its lower position (FIGS. 3 and 4) in 120 movements or actuations of the escapement mechanism. If the chamber 5a holds 120 ml of lubricant, 1 ml of lubricant will be dispensed on each actuation of the escapement mechanism. The timing means will need to be set to operate the escapement mechanism approximately once every 6 hours (i.e. 4 times a day) to discharge the lubricant contents in one month (approximately 30 days). For operation over 2 years, on the other hand, the escapement mechanism would need to be operated once every 6 days or so. Since the escapement mechanism requires relatively little electrical power to be operated, a relatively small battery 20 can be used to power the lubricator.

To minimise cost and to provide a lightweight lubricator, the gear wheels of the gearing are preferably made of plastics material. Four racks and associated gear wheels are provided to spread the force exerted by the spring means through the rack members to the gear wheels and to minimise the risk of the teeth being deformed or broken off in use. Alternatively, however, the rack members and gear wheels could be metallic, such as pressure diecast zinc alloy rack members and gearing. Although more expensive to produce, such components would be stronger and it would not be so necessary to double up on the numbers of rack members and gear wheels.

Figure 12:
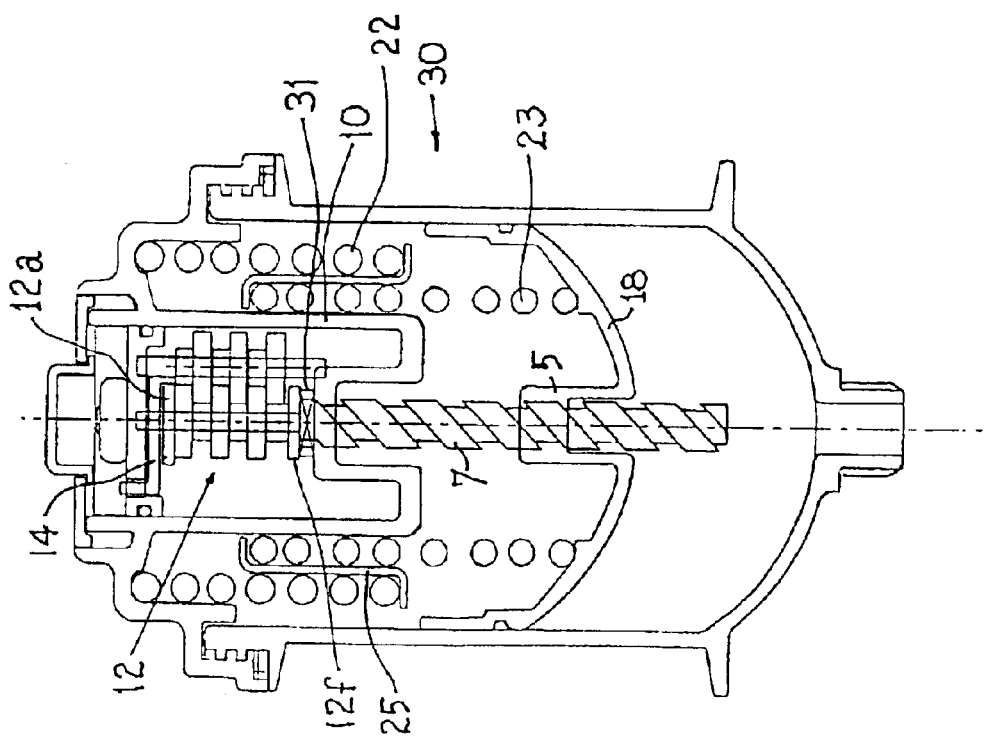
FIG. 12 is a schematic view of a second embodiment of a lubricating device according to the invention in the form of a self-contained automatic single-point lubricator.
Figure 10:
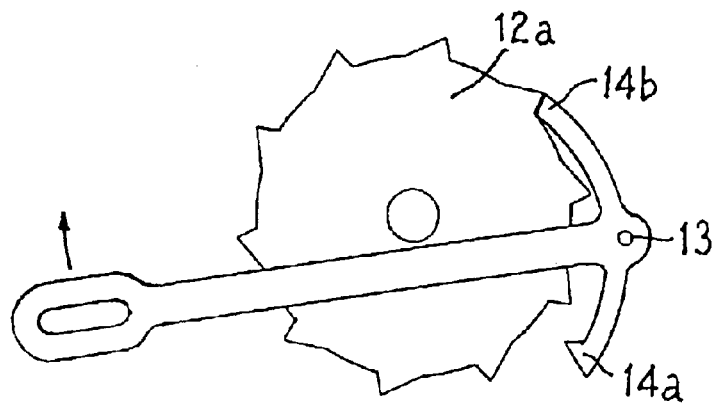
FIGS. 10 and 11 are schematic views from above of an escapement mechanism of the lubricating device shown in FIGS. 1 and 2.
Figure 9:
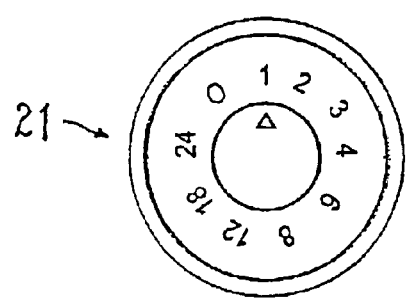
FIG. 9 is a view from above of the lubricating device of FIGS. 1 and 2 and which shows just an adjustable end cap of the lubricating device.
Figure 11:
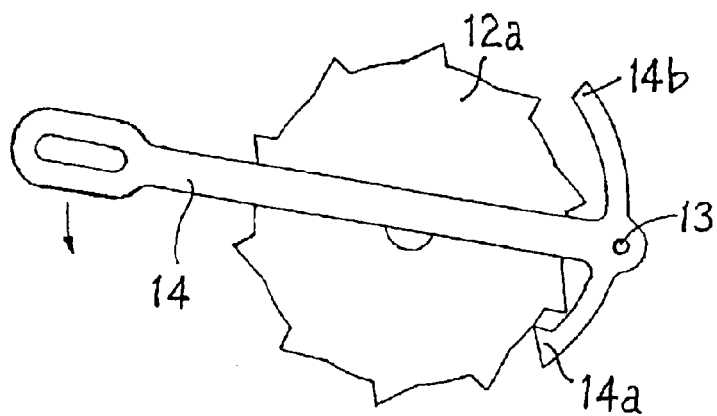

A second embodiment of a self-contained automatic lubricator 30 is shown in FIG. 12. Where possible the same reference numerals as used in the embodiment shown in FIGS. 1 to 11 have been used to identify the same or similar parts of the lubricators. The lubricator 30 illustrates a schematic arrangement in which the piston device 18 has a central, internally threaded tubular boss 5 which is screw-threadedly engaged with a turnable, externally threaded elongate control member 7. The piston device 18 is moved by the spring pressure exerted by the compressed springs 22 and 23. The screw-threaded connection between the boss 5 and the control member 7 combined with the downward movement of the piston device 18 causes the control member 7 to turn as the boss "rides down" the control member and this turning movement is transmitted through gearing 12 to the escapement mechanism. The control member 7 is journalled for rotation in the bottom wall of the cylindrical recess 10 and is also provided with a small axial thrust bearing 31. The gearing 12 includes a gear wheel 12f which is secured to the upper end of the control member and forms the lowermost one of a set of gear wheels arranged one above the other of the gearing 12. The actual turning of the control member 7, and thus the downward movement of the piston device, is controlled by the escapement mechanism which, in this embodiment, is provided by a rocker arm 14 and escapement wheel 12a forming the uppermost gear wheel of the gearing 12. In use, the piston device is restrained from being turned by the pressure and frictional contact of the spring 23 and by the friction between the piston device and the side walls of cylinder 2.

In the embodiment of FIG. 12 the screw threads conveniently have a relatively large pitch so that the piston device 18 will be advanced from its rear position to its forward position with a small number of turns of the control member 7. More importantly, however, the steep angle of the screw threads ensures an efficient conversion of the downward, axial movement of the piston device 18 to a rotary movement of the control member 7.

FIGS. 13 to 15 illustrate a third embodiment of a self-contained lubricator 40. The lubricator 40 is similar in many respects to the lubricator 1 and only the differences between the two lubricators will be described in detail herein. Where possible the same reference numerals as used in the first embodiment shown in FIGS. 1 to 11 have been used to identify the same or similar parts of the lubricator 40.

The main difference between the lubricators 1 and 40 is that in lubricator 1 the helical springs 22 and 23 surround a central region in which is located the gearing 12, the escapement mechanism (12a, 13, 14) and the electrical means 16. In lubricator 40, the helical spring 22 is located in a central region and the gearing 12, escapement mechanism (12a, 13, 14) and electrical means 16 are arranged in region radially surrounding this central region. In other words the spring 22 is positioned "inside" the surrounding gearing, escapement mechanism and electrical means.

In lubricator 40, the single helical spring 22 is received within a tubular piston extension 41 extending rearwardly and axially from a central region of the piston device 18 and exerts pressure on the piston device 18. In the embodiment shown two racks 6, 7 are moulded on the outside of the piston extension 41 although one or more than two such racks could be provided in alternative designs. The rearwardly extending piston extension 41 is telescopically received in a slightly larger forwardly extending tubular extension 42 which may be a part of, or be fixed to, e.g. clamped to, the cap 3. The racks 6, 7 are received in corresponding longitudinal slideways or guides 43 and 44 formed in the tubular extension 42.

The gearing, escapement mechanism and electronic control pack of the lubricator 40 function similarly to those described with respect to the lubricator 1 but are arranged outside the tubular extensions 41 and 42. As can be seen from FIG. 15, the electrical means 16 including battery 20 is displaced about 90° from the solenoid device 17. The main part of the gearing 12 is displaced approximately 180° from the battery 20 and approximately 90° from the solenoid device, although the gearing wheels which mesh with the racks 6 and 7 are positioned diametrically opposite each other and are displaced approximately 90° from the battery 20 and the main part of the gearing 12. In the lubricator 40, the escapement rocker arm 14 is angled or "cranked" so that its pivotal movement can be controlled by the solenoid device 17 for controlling the cooperation of the projection 14a and portion 14b with the gear wheel 12a.

In each of the three embodiments of the invention illustrated in FIGS. 1–11, FIG. 12 and FIGS. 13–15, it can be seen that by compact arrangement of the spring means and control means within the lubricator, the ratio of the overall volume of the lubricator to the volume of lubricant the lubricator is designed to dispense has been kept down to below 5:1, and typically to about 2.5:1.

Figure 16:
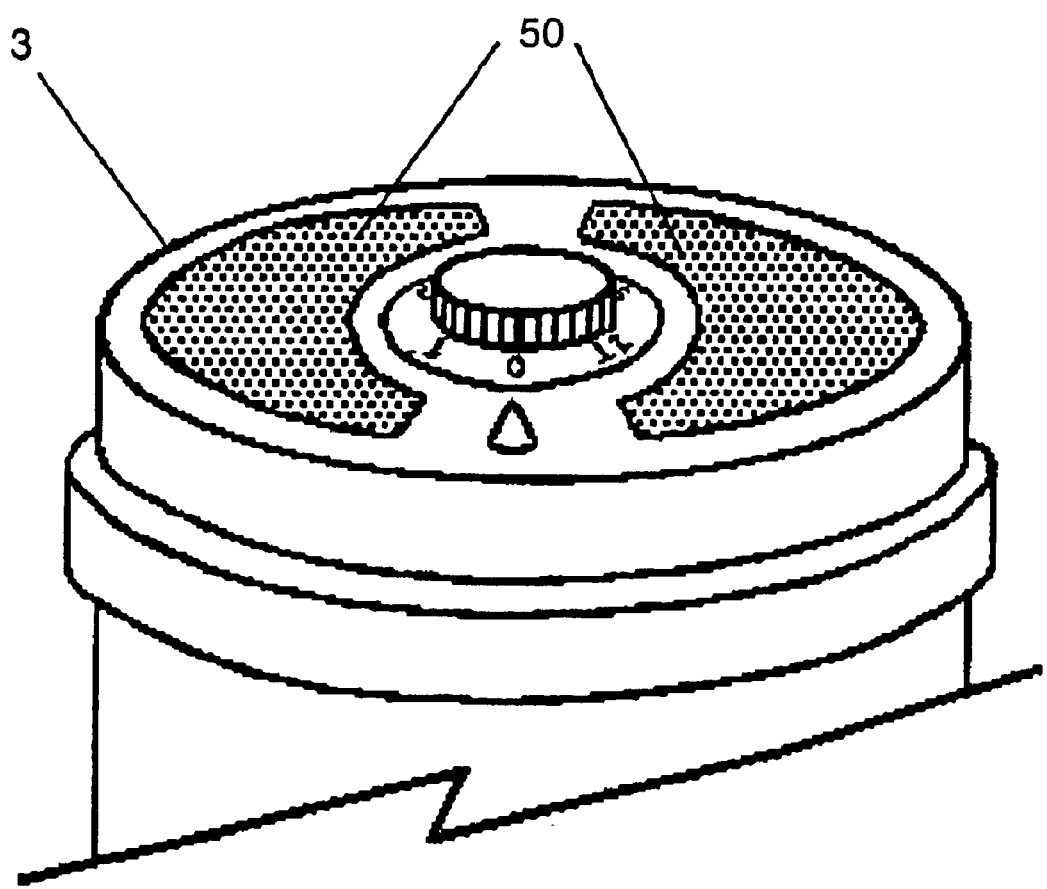
FIG. 16 is fragmentary perspective view of an alternate embodiment of the lubricating device illustrated in FIG. 1, incorporating solar cells.
Figure 17:
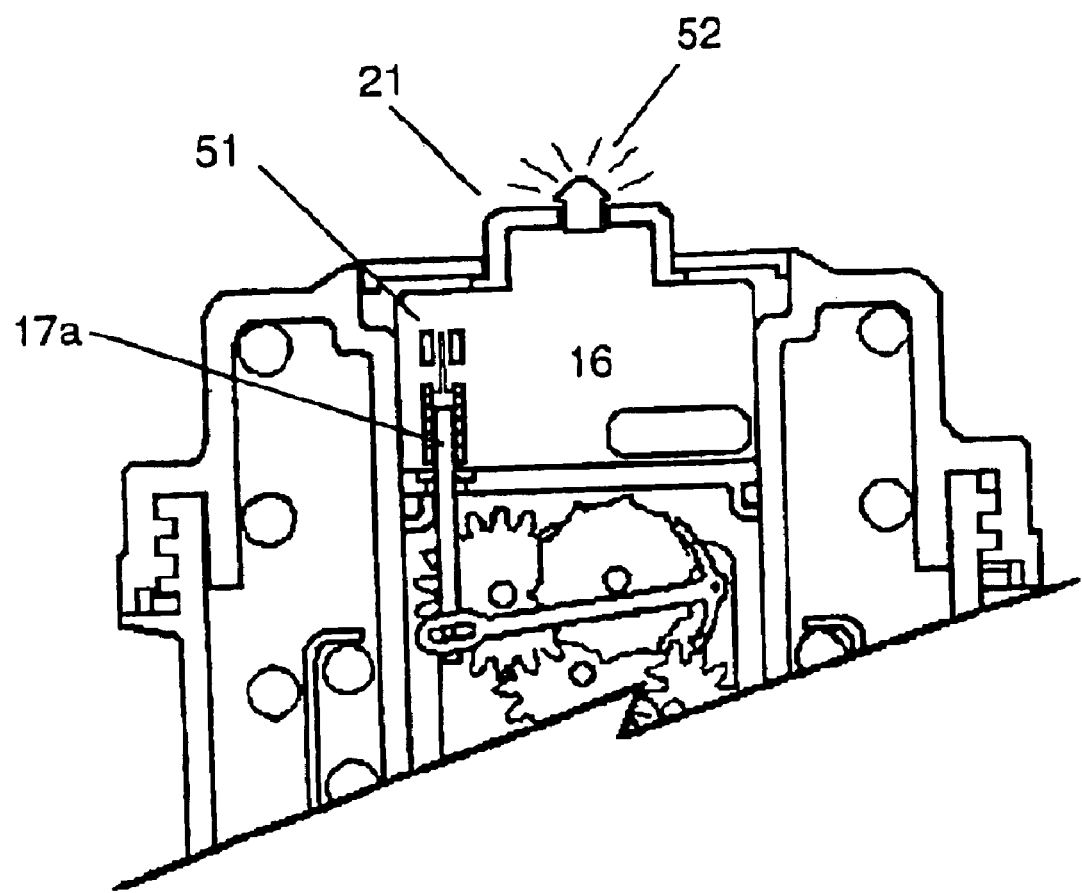
FIG. 17 is a fragmentary schematic side view of an alternate embodiment of the lubricating device illustrated in FIG. 3, incorporating a sensing device and an alarm device.
Figure 18:
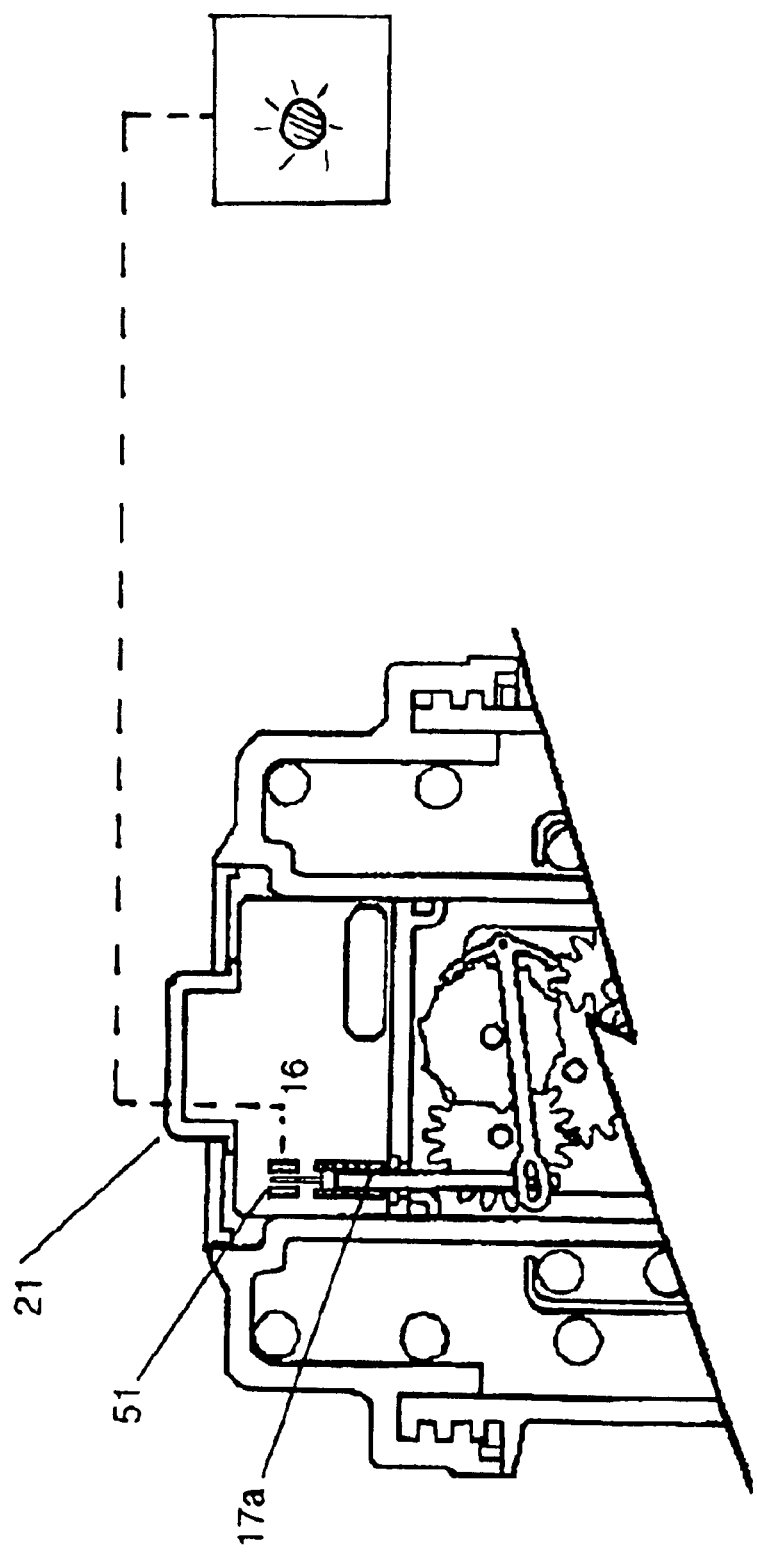
FIG. 18 is a fragmentary schematic side view of an alternate embodiment of the lubricating device illustrated in FIG. 17, incorporating a remote alarm device.

In other embodiments another embodiment of the invention shown in FIG. 16, the battery for providing the electrical means 16 may be replaced or augmented by solar powered means, e.g. solar cells 50 on the lubricator housing 3. Referring to FIGS. 17 and 18, it is possible for the lubricating device to include sensing means 51 for automatically detecting and signaling any failure of the lubricating device to dispense lubricant as required. For instance, the motion of the escapement gear wheel 12a or of the escapement rocker arm 14 could be monitored. Any failure to detect the movement of such movable parts within a period of time could be used to automatically trigger a warning device. As shown in FIG. 17, the warning device could be a visual device, such as an LED 52, and/or an audible device on the lubricating device. Alternatively, as shown in FIG. 18, the warning device 52 could be located at a remote location from the lubricating device. Such an electronic sensing and monitoring system would be used to sense and alert personnel to any malfunction of the lubricating device and/or any blockages in lubricating channels or bearings to which the lubricating device is fixed.

Although the present invention is primarily intended to relate to the automatic dispensing of fluent lubricant, the invention may have application to the automatic dispensing of other fluent materials.

What is claimed is:

1. A lubricating device for automatically dispensing fluent lubricant over an extended period of time, comprising a cylinder having a front wall with a discharge outlet, a rear wall and cylindrical side walls;

a piston movable within the cylinder from a rear position to a forward position, the piston and the side and front walls of the cylinder defining a variable volume chamber for containing the lubricant to be dispensed;

a spring movable from a compressed condition to an expanded condition to release spring force for moving the piston from its rear position towards its front position to reduce the volume of the said variable volume chamber over a period of time for expelling lubricant through the discharge outlet; and a controller for controlling the movement of said spring from its compressed condition to its expanded position and comprising;

an escapement mechanism;

an electrical element controlling the operation of the escapement mechanism; and gearing connected between said escapement mechanism and said piston;

wherein one of said gearing and said spring is positioned in a central first region extending axially of the cylinder and in that the other of said gearing and said spring is positioned in a second region which surrounds said first region.

2. A lubricating device according to claim 1, wherein said gearing is positioned in said first region and said spring surrounds the gearing.

3. A lubricating device according to claim 2, wherein the escapement mechanism is positioned inside, so as to be surrounded by, the spring.

4. A lubricating device according to claim 2, wherein the electrical element is positioned inside, so as to be surrounded by, the spring.

5. A lubricating device according to claim 1, wherein said spring is positioned in said first region.

6. A lubricating device according to claim 5, wherein the controller further comprises a control member providing a connection between the gearing and the piston.

7. A lubricating device according to claim 6, wherein the control member is positioned in said second region.

8. A lubricating device according to claim 5, wherein the escapement mechanism is positioned in said second region.

9. A lubricating device according to claim 5, wherein the electrical element is positioned in said second region.

10. A lubricating device according to claim 1, wherein the controller further comprises a control member providing a connection between the gearing and the piston.

11. A lubricating device according to claim 10, wherein the control member is positioned in said first region.

12. A lubricating device according to claim 10, wherein the control member comprises at least one rack member connected to the piston and in mechanical connection with at least one gear wheel of said gearing.

13. A lubricating device according to claim 12, wherein the at least one rack member has at least two sets of teeth in mechanical connection with at least two gear wheels of said gearing.

14. A lubricating device according to claim 10, wherein the control member comprises a rotatable screw-threaded member connected to said gearing and screw-threadedly engaged with a threaded element screw provided on the piston, movement of the piston from its rear position to its forward position by the action of the spring causing the screw-threaded member to turn, the turning of the screw-threaded member being controlled by the escapement mechanism and the gearing thereby regulating the movement of the piston.

15. A lubricating device according to claim 1, wherein the external volume of the lubricating device is no more than 5 times the maximum internal volume of the said variable volume chamber.

16. A lubricating device according to claim 1, wherein the spring is a helical compression spring acting on the piston.

17. A lubricating device according to claim 16, wherein there are at least two helical compression springs arranged coaxially one within the other, and wherein, for the or each radially adjacent pair of helical compression springs, a force transmitting device is arranged to transmit the spring force from one end of the radially inner spring to the other end of the radially outer spring.

18. A lubricating device according to claim 1, wherein the electrical element comprises a power supply, an actuator for operating the escapement mechanism, and a settable timer for controlling the frequency of operation of the actuator for controlling the rate of discharge of the fluent lubricant from the variable volume chamber.

19. A lubricating device according to claim 18, wherein said power supply comprises at least one of an electric battery and solar power means.

20. A lubricating device according to claim 19, wherein said timer is settable for dispensing lubricant over a period of from 1 to 24 months.

21. A lubricating device according to claim 18, wherein said timer is settable for dispensing lubricant over a period of up to 36 months.

22. A lubricating device according to claim 1, wherein said gearing comprise a plurality of meshing gear wheels made of plastics material.

23. A lubricating device according to claim 1, wherein the device further comprises a sensor for sensing an operational failure of the device.

24. A lubricating device according to claim 23, wherein said sensor comprises a visual alarm device and a sensing device for providing a sensing signal to said alarm device to activate the latter if a movable part of the lubricating device fails to move within a predetermined period of time.

25. A lubricating device according to claim 24, wherein said visual alarm device is mounted on and forms part of the lubricating device.

26. A lubricating device according to claim 24, wherein said visual alarm device is situated at a location remote from the lubricating device.

27. A lubricating device according to claim 1, wherein the external volume of the lubricating device is no more than 2.5 times the maximum internal volume of the said variable volume chamber.

28. A device for automatically dispensing fluent material over an extended period of time, comprising:

a cylinder having a front wall with a discharge outlet, a rear wall and cylindrical side walls, a piston movable within the cylinder from a rear position to a forward position, the piston and the side and front walls of the cylinder defining a variable volume chamber for containing the fluent material to be dispensed;

a spring movable from a compressed condition to an expanded condition to release spring force for moving the piston from its rear position towards its front position to reduce the volume of the said variable volume chamber over a period of time for expelling fluent material through the discharge outlet; and a controller for controlling the movement of said spring from its compressed condition to its expanded position and comprising:

an escapement mechanism;

an electrical element controlling the operation of the escapement mechanism; and gearing connected between said escapement mechanism and said piston;

wherein one of said gearing and said spring is positioned in a central first region extending axially of the cylinder and in that the other of said gearing and said spring is positioned in a second region which surrounds said first region.

* * * * *